3,460,847
FIXTURE MOUNTING ASSEMBLY
George Hohwart, Farmington, and Paul Toth, Allen Park,
Mich., assignors to N. A. Woodworth Company, Ferndale, Mich., a corporation of Michigan
Filed June 10, 1965, Ser. No. 462,970
Int. Cl. B23b 31/10, 5/22
U.S. Cl. 279—4    16 Claims

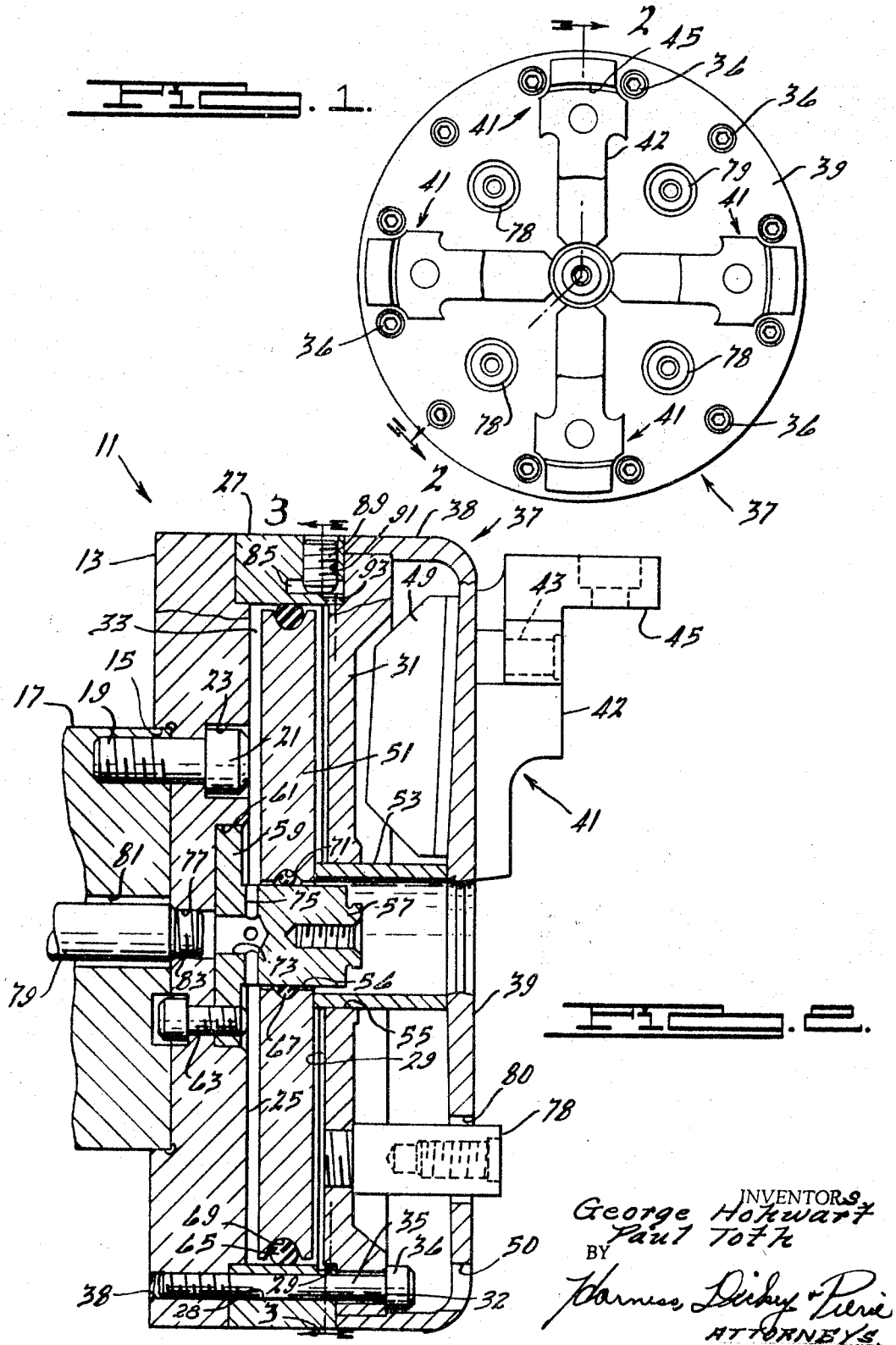

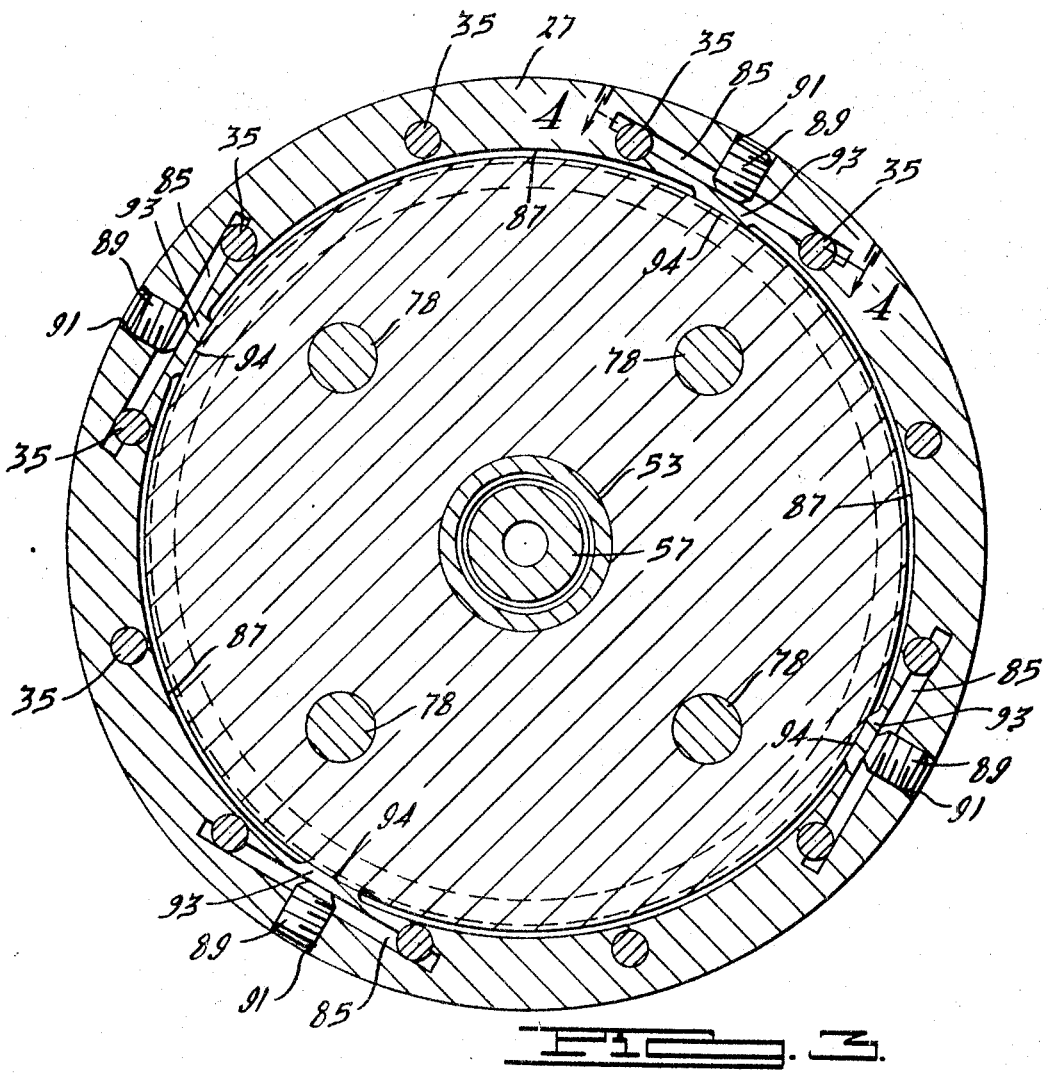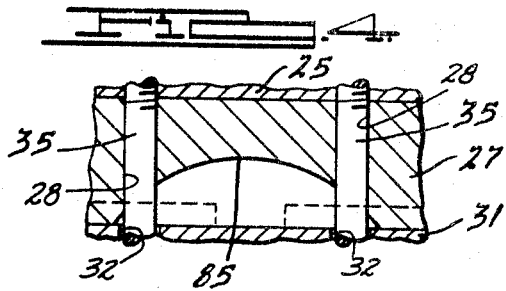

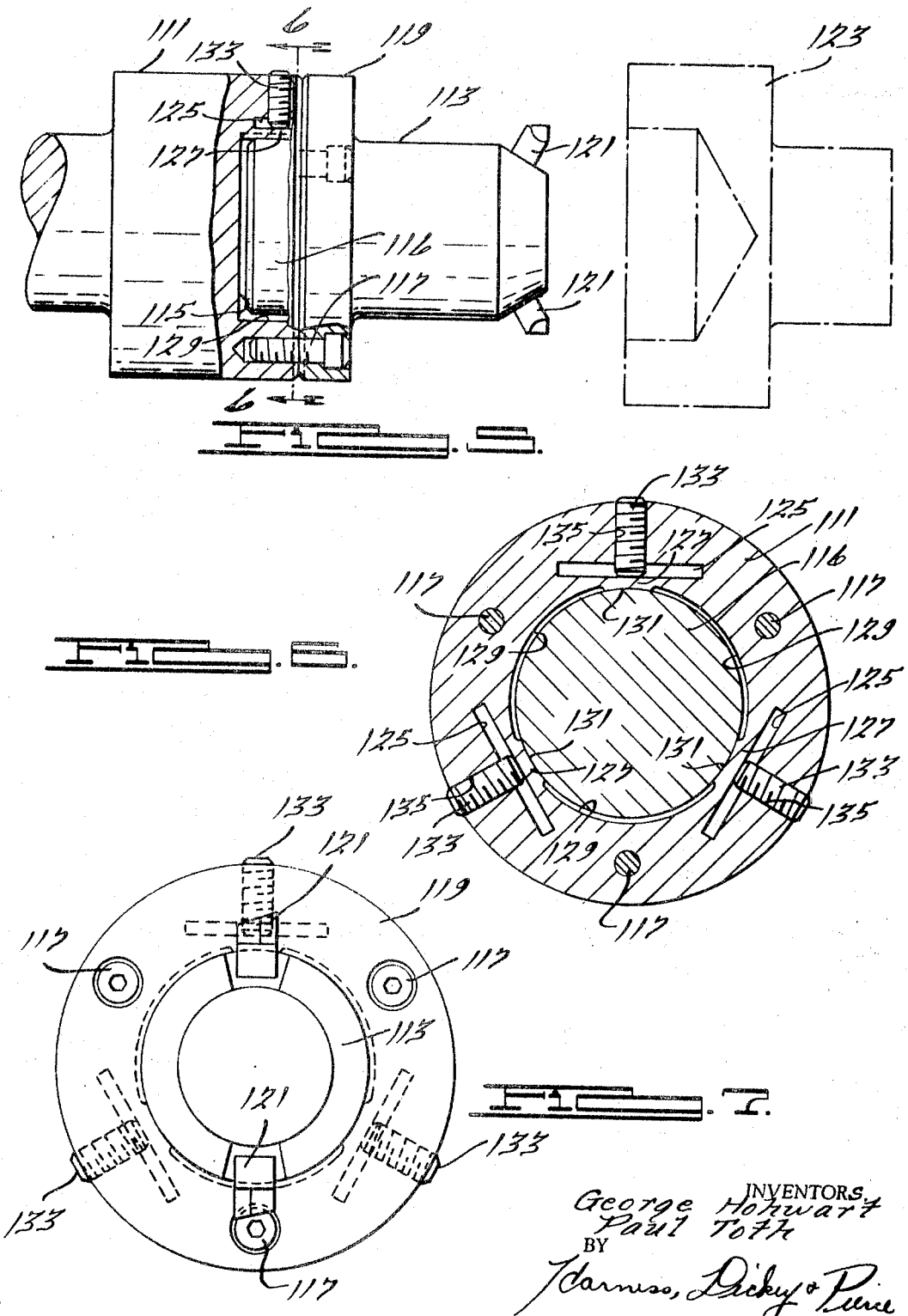

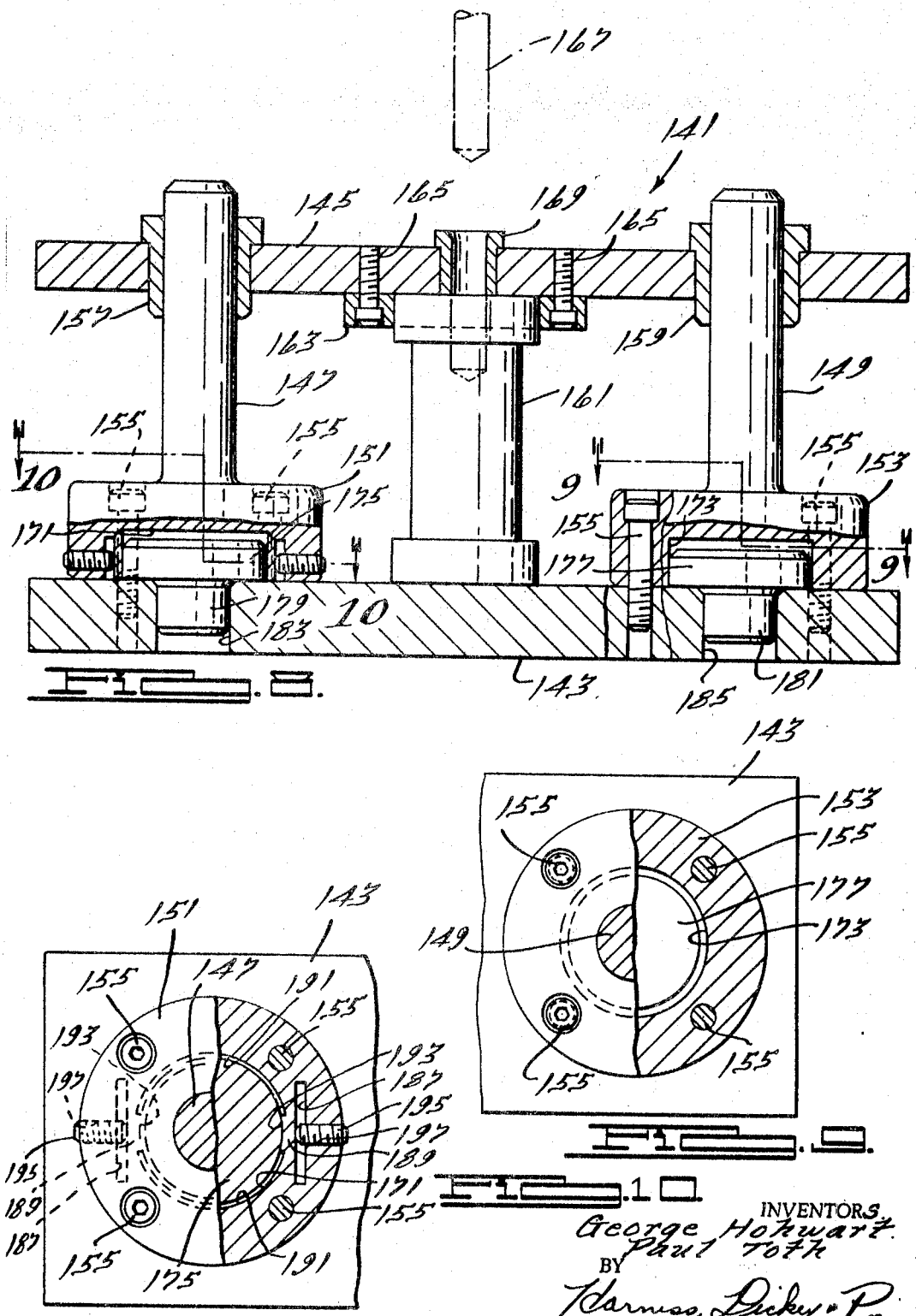

ABSTRACT OF THE DISCLOSURE

In its broader aspects, the disclosure comprises two interfitting annular parts that normally have an essentially close fit but, at the same time, are radially adjustable relative to each other for a limited distance. The disclosure has particular utility in rotatable work holding chucks and in tool or work holding clamping fixtures although it obviously can be used in many different applications and environments. In the case of work holding chucks the adjustment means of this invention is used primarily to adjust the work holding part of the chuck relative to the base or mounting portion thereof so that a workpiece carried by the chuck will run precisely concentrically to a spindle or other part to which the base portion is attached. By reason of its unique construction, the adjustment means causes the work holding and mounting portions to snugly interfit and tightly engage each other in all adjustment positions of the parts.

---

This invention relates to fixture mountings, and particularly to an improved adjustable fixture mounting assembly.

In general, an adjustable mounting assembly for fixtures should be sturdy and accurate, easy to manipulate and relatively inexpensive to manufacture among other things. In some installations, one or more of these requirements may be more critical than others. Thus, in those installations where the fixture rotates as by being secured on a rotating machine spindle, it becomes more important that the fixture run true or concentric. The fixture mounting here must therefore be capable of adjustment to establish this true-running relation and must be sturdy enough to maintain it even under high working forces thereon. One example is a machine, such as a boring or honing tool, secured to a machine spindle. Since the different parts making up the tool mounting are separately made, there does exist some variation in size from one part to the next and in mating parts. Therefore, inasmuch as the accuracy of the machining operation depends largely on the tool mounting establishing and maintaining a true tool-running relation, a very accurate and sturdy tool mounting is required.

A further example is a clamping fixture or jig used to secure a workpiece and locate it during a machining operation performed thereon. These jigs conventionally include a base and a clamping plate movable relative thereto on a plurality of posts fixed to the base to clamp the workpiece. For proper jig functioning, the clamping plate must slide easily on the posts; however, since these parts are separately made, binding between the plate and posts can and often does occur by reason of manufacturing inaccuracies or because the parts are not properly aligned. Therefore, it is desirable here also that the parts be adjustable; however, the accuracy of the machining operation on the secured workpiece depends upon the accuracy of the adjusted parts and that they be securely held.

Another and perhaps more important example is a diaphragm chuck which, in general, includes a resilient member or diaphragm having a plurality of jaws attached thereto and is fixed upon a mounting plate which in turn is piloted on a machine spindle for rotation therewith. The diaphragm is actuated by means such as air pressure, for example, which causes it to flex so as to disengage a workpiece held in the chuck jaws. Upon removal of the workpiece and insertion of a new workpiece in the chuck jaws, the actuating means is released and the resilient diaphragm member automatically springs back to its original position with the jaws gripping the new workpiece.

Many customers require that these chucks run true or concentric with the spindle to an exceedingly close tolerance on the order of one one-thousandths of an inch or less and that there be no loose-fitting parts in the chuck assembly. Thus, even though each of the chuck components is precisely finished to size, they must also be very accurately assembled in order for the chuck to be concentric.

This problem becomes acute in the machining industry in that many of the chucks require disassembly in order to fasten the chuck mounting plate to the machine spindle. Therefore, even though the chuck components are accurately finished and precisely assembled originally for true and concentric rotation, manufacturing tolerances in these components may allow them to run eccentric. Also, any one or several of these components may be distorted during reassembly. For example, the screws used to hold the chuck components together may be tightened differently in the reassembly sequence and this can easily cause a chuck runout or eccentricity of up to several thousandths of an inch. Thus, in the absence of any adjustment feature on the machine spindle, the chuck itself must be removed and readjusted to provide concentric operation.

One solution for this problem would be to provide a loose pilot fit between the flexible diaphragm and the machine spindle with the parts held in place by connecting screws and peripheral set screws. Thereafter, the parts could be adjusted to provide exact concentricity between the chuck and the spindle. However, this type of construction would undesirably increase the length of the chuck. Also, because of the high degree of accuracy required for this type of chuck as set forth above, the solution is not acceptable since the joint can become loose and create undesirable error while the chuck is in use. Consequently, if this error is not discovered, the machined parts held by the chuck during this time are unacceptable and must be discarded.

Main objects of the present invention, therefore, are a mounting for rotating fixtures which is adjustable after assembly to establish and maintain exact concentricity in fixture rotation and which has no loose-fitting parts.

Additional objects include an adjustable fixture mounting of the above character particularly adapted for rotating diaphragm type chucks and for machine tools.

Other objects include an adjustable mounting adapted for use with a variety of other fixtures of both the rotating and nonrotating type and which maintains the components tight during adjustment.

Further objects are an adjustable fixture mounting of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a plane view of a preferred form of this invention illustrating a chuck embodying the present invention;

FIG. 2 is an enlarged sectional view of FIG. 1 taken substantially along the line 2—2 thereof;

FIG. 3 is a sectional view of FIG. 2 taken along the line 3—3 thereof;

FIG. 4 is a fragmentary sectional view of FIG. 3 taken along the line 4—4 thereof;

FIG. 5 is a side elevational view, partly in section, illustrating a machine spindle embodying the present invention;

FIG. 6 is a sectional view of FIG. 5 taken along the line 6—6 thereof;

FIG. 7 is an end view of the machine tool of FIG. 5;

FIG. 8 is an elevational view, partly in section, illustrating a clamping fixture or jig embodying the present invention;

FIG. 9 is a sectional view of FIG. 8 taken along the line 9—9 thereof; and

FIG. 10 is a sectional view of FIG. 8 taken along the line 10—10 thereof.

Broadly described, the present invention comprises a fixture base and a supporting member, one of which encompasses at least part of the other and wherein one of the base and supporting member has a plurality of angularly spaced radially deflectable sections or fingers at the encompassing area separated by relieved portions adapted to interferingly engage the other of the base and supporting member. By controllably deflecting these flexible sections, the lateral positions of the fixture and supporting member are adjusted relative to each other.

Referring now more specifically to the drawings, and particularly FIGS. 1-4, a chuck embodying the present invention is shown generally at 11 and includes a mounting plate 13 having a recess 15 snugly receiving the end of a machine spindle 17 therein. A plurality of screws 19, each having a head 21 positioned within a socket 23 formed in the mounting plate 13, removably attach the mounting plate to the spindle 17. The mounting plate 13 has a forwardly extending embossment 25 which projects into and is snugly received by one end of a cylinder 27. Alternatively, the mounting plate 13 and cylinder 27 can be integral. The other end of the cylinder 27 snugly receives a rearwardly extending embossment 29 formed on a backing plate 31 with the backing plate, the cylinder 27 and the mounting plate 13 together defining a chamber 33. A plurality of screws 35, each having a head 36, extend through openings 32 in the backing plate 31 and openings 28 in the cylinder 27 and are threadedly received within openings 38 in the mounting plate 13 and hold the mounting plate 13, the cylinder 27 and the backing plate 31 together.

A generally cup-shaped diaphragm 37 has an integral annular side wall 38 snugly receiving the outer surface of the backing plate 31 and a flexible forward portion 39 having a plurality of jaw assemblies 41 mounted thereon and arranged in annular series around the axis of the chuck. The jaw assemblies illustrated here are four and each includes a jaw holder 42 attached to the diaphragm portion 39 by screws 43 or by copper brazing to afford a permanent connection, if desired. These holders 42 are each adapted to removably receive a jaw (not shown) at a mounting portion 45. However, it is to be understood that the number, configuration and arrangement of the particular jaws and jaw holders will vary according to the workpiece to be gripped. In practice, the jaw assemblies 41 are opened to receive a workpiece (not shown) by flexing the forward portion 39 of the diaphragm forwardly or outwardly which causes the jaw assemblies to move radially outwardly. When the diaphragm is released, it springs back automatically and causes the jaw assemblies 41 to move radially inwardly gripping the workpiece 47 and holding it rigidly for a machining or other operation. A counter weight 49 is provided on the rear face of the flexible wall 39 behind each of the jaw assemblies 41 to offset any tendency of the jaws to open as the result of centrifugal forces developed during rotation of the spindle 17. A plurality of holes 50 is provided in the diaphragm forward wall 39 for freely inserting and removing the screws 35.

The flexible wall 39 of the diaphragm 37 is flexed forwardly or outwardly by forward movement of a piston 51 disposed to reciprocate back and forth within the cylinder 27. As shown in FIG. 2, the piston 51 is positioned to engage the rearward end of an annular sleeve 53 slidably received within an opening 55 in the backing plate 31 and having its forward end engaging the flexible wall 39 of the diaphragm 37. The piston 51 has a center opening 56 slidably receiving a forward extension 57 of an adapter 59 fixed within a recess 61 of the mounting plate 13 by a plurality of screws 63. A pair of O-rings 65 and 67 are disposed in outer and inner peripheral grooves 69 and 71 in the piston 51 and sealingly engage the inner surface of the cylinder 27 and the outer surface of the extension 57, respectively. The adapter 59 has an opening 73 at its rearward end communicating with a plurality of radially extending passageways 75 opening into the chamber 33 and with a hole 77 formed in the mounting plate 13. A tube 79 extends through an axial bore 81 in the spindle 17 and has a threaded terminal 83 screwed into the hole 77.

In operation, air under pressure is introduced into the chamber 33 behind the piston 51 through the tube 79, the hole 77, the opening 73 and the passageways 75 and this air moves the piston forwardly or to the right as viewed in FIG. 2. As the piston 33 advances, it forces the annular sleeve 53 forwardly thereby pressing against the flexible front wall 39 of the diaphragm 37 and displacing it outwardly, whereupon the jaw assemblies 41 move radially outwardly and the jaws (not shown) are released from the workpiece (not shown). Conversely, when the air under pressure is released, the flexible wall 39 automatically springs back to its original position and the jaw assemblies 41 move radially inwardly of the chuck with the jaws (not shown) gripping the workpiece. A plurality of workstops (not shown) may be removably attached to holders 78 fixed to the backing plate 31 and extending through openings 80 in the diaphragm forward wall 39 to accurately position the workpiece in the chuck as desired. Similarly, a workstop (not shown) can be attached to the end of the forward extension 57 of the adapter 59 to engage and position a workpiece held by the chuck, the particular configuration and arrangement of workstops being selected according to the particular workpiece being handled.

As set forth above, it is of the utmost importance that the chuck run concentric to the spindle during use since the degree of accuracy to which a workpiece held by the chuck can be finished depends on this concentricity, and for this reason it is equally important that there be no loose-fitting parts. Thus, the fit between the backing plate 31 and the annular side wall 38 of the diaphragm 37 usually is an interference fit and welded or brazed. The fits between the cylinder 27 and the embossments 25 and 29 of the mounting plate 13 and the backing plate, respectively, are close tolerance clearance fits preferably size to size or a few thousandths interference. however, as described above, even though these components are fit originally to run concentric, manufacturing tolerances of these components or distortion of any on or several of these components may occur and cause the chuck to run eccentrically when the chuck is disassembled and reassembled as is required for attaching the mounting plate 13 to the spindle 17 by the screws 19. These tolerances cause the chuck to have a runout of several thousandths of an inch or more, which, as described above, is highly undesirable.

According to the present invention, the chuck 11 is constructed to permit lateral adjustment thereof relative to the spindle 17 after the chuck has been assembled and without the use of any loosefitting parts. As seen in FIGS. 2-4, the cylinder 27 is provided with a plurality of angularly spaced slots 85 cut into and extending axially and rearwardly from its forward face. The slots 85 are shown as arcuate in cross-section but are not to be limited to such. These slots 85 are disposed near the inner surface of the cylinder 27 and therefore form a plurality of flexible sections or fingers 93, the end portion of each of which overlies the embossment 29 of the backing plate 31 which forms a base for the chuck fixture. The inner surface of the cylinder 27 adjacent the backing plate 31 has peripheral relief areas 87, the depth or axial length of which exceeds the length of the embossment 29 and which extend entirely therearound except for relatively small areas 94 on each of the fingers 93. A plurality of set screws 89 is threadedly received within openings 91 in the cylinder 27, one adjacent each of the slots 85, and each of the screws 89 has its inner end positioned to engage a respective one of the flexible fingers 93. The I.D. of the cylinder 27 at the areas 94 is size to size with or a few thousandths of an inch smaller than the diameter of the embossment 29 to provide a close tolerance fit therebetween. This is preferable; however, in some installations a loose fit of a few thousandths may be acceptable. In any case the backing plate 31 is held securely in position and does not move laterally during and even before tightening any of the screws 89 making an accurate adjustment of the chuck more easily attainable. Thus, by tightening a selected one or ones of the set screws 89 and loosening the others, the flexible fingers 93 adjacent the tightenend screws are moved radially inwardly of the chuck shifting the backing plate 31 laterally of the cylinder 27. The fingers 93 adjacent the loosened set screws 89 flex radially outwardly and this along with the relief areas 87 accommodates the shifted backing plate 31. In this connection, it will be readily apparent that the holes 32 in the backing plate 31 are provided with sufficient clearance to permit the plate to shift a desired amount in the manner described.

In practice, it has been found that the backing plate 31 and the diaphragm 37 can be shifted laterally relative to the spindle as much as ten-thousandths of an inch or more in this manner while still retaining a secure fit between the cylinder 27 and the embossment 29 of the backing plate 31. This is more than sufficient to correct normally occurring runout problems of the type referred to above and to bring the chuck back into concentric relation with the spindle 17.

In the structure described in detail above, the lateral adjustment was provided at the generally cylindrical joint between the backing plate 31 and the cylinder 27; however, it is to be understood that the present invention is intended to encompass a chuck or other fixture having this type of joint at other interfitting parts between the diaphragm 37 and the spindle 17 and wherein the generally complementary surfaces at the joint are other than cylindrical. In a diaphragm chuck of the type here shown, it would be difficult as a practical matter to provide the adjustment feature between the diaphragm 37 and the backing plate 31 as the diaphragm usually is brazed or otherwise integrally formed with the backing plate so that they are in effect one piece. It would, of course, be feasible to put the adjustment feature at the joint between the cylinder 27 and the mounting plate 13 or even between the mounting plate 13 and the spindle 17. Manifestly, in a chuck of different design, there would be still other convenient places to incorporate the adjustable means. In any event, however, it is necessary to put the adjustable feature at some location between the diaphragm 37 and the spindle 17 so that the part of the assembly in front of the adjustment means comprises or at least is associated with the diaphragm and the part of the assembly behind the adjustment means is adapted for mounting on the spindle or perhaps even comprises the spindle itself. Accordingly, in a sense and for the purpose of this invention, the spindle in at least one embodiment of the invention can be considered to be part of the chuck assembly. For convenience, therefore, the components ahead of the adjustment means are referred to herein as the diaphragm portion of the chuck and the components behind the adjustment means are referred to as the mounting portion of the chuck. In addition, the four flexible fingers 93 shown in the preferred embodiment are intended for illustration only and it is to be understood that three or more such fingers may in some cases be more desirable.

Another embodiment of the invention is illustrated in FIGS. 5–7 and is seen to include a machine spindle or spindle attachment 111 having tool body 113 secured thereto. The spindle 111 has a recess 115 at its forward end adapted to receive a generally complementary embossment 116 on the end of the tool body 113. The generally cylindrical configuration of the recess 115 and the embossment 116 is intended to be illustrative only and it is to be understood that other configurations may be equally acceptable. A plurality of screws 117 extend through a flanged base 119 on the tool body 113 and are threaded into the spindle 111 to secure the body thereto. A plurality of tools 121 secured to the forward end of the tool body 113 are adapted to finish a surface of a workpiece shown in dot-dash lines at 123.

As was the case in the chuck of FIGS. 1–4, it is of great importance that the tool body 113 run true or concentric to the spindle 111 during use since the degree of accuracy in a machining operation using this tool depends upon its concentricity. Thus, even though the spindle 111 and tool body 113 are manufactured originally to run concentric, manufacturing tolerances or distortion of any one or both may allow the tool to be eccentric. Therefore, the spindle 111 has a plurality of or at least three angularly spaced slots 125 cut into and extending axially and rearwardly from its forward face. These slots 125 are disposed near the surface of the recess 115 and form a corresponding number of flexible fingers 127. The surface of the recess 115 has peripheral relief areas 129, the axial length of which exceed the length of the embossment 116 and which extend entirely therearound except for relatively small areas 131 on each of the fingers 127. A plurality of set screws 133 is threadedly received within openings 135 in the spindle, one adjacent each of the slots 125, and each of the set screws has its inner end positioned engage a respective one of the flexible fingers 127. As was the case within the chuck of FIGS. 1–4, the diameter of the recess 115 at the areas 129 is preferably size to size with or a few thousandths small than the diameter of the embossment; however, a loose fit of a few thousandths may be acceptable in some installations. In any event, the parts are secured in position during and even before adjustment and by tightening a selected one or ones of the set screws 133 and loosening others. The flexible fingers 127 adjacent the tightened fingers move radially inwardly of the spindle 111 shifting the tool body embossment 116 and the body 113 laterally. The fingers 127 adjacent the loosened set screws 133 flex radially outwardly and this action along with the relief areas 129 accommodates this shifting.

FIGS. 8–10 illustrate still another embodiment of the present invention. Thus, a clamping fixture or jig shown generally at 141 is seen to include a rigid base 143 and a clamping plate 145 movable toward and away therefrom. A plurality of posts 147, 149 in this case two have their base portions 151, 153 seated upon the top surface of the base 143 and removably secured thereto by screws 155. The posts 147, 149 are slidably disposed, each in a bushing 157, 159, respectively, provided in the clamping plate 145.

In use, a workpiece, illustrated at 161, is positioned between the base 143 and the clamping plate 145 and located by suitable means such as a ring 163 secured to the clamping plate by screws 165 whereupon the clamping plate 145 is moved toward the base 143 to the position illustrated in FIG. 8 and secured by means (not shown). Thereafter, a tool, shown in dot-dash lines at 167, is actuated and performs a machining operation on the workpiece 161, the tool being guided by a tool guide 169 mounted in the clamping plate 145. Upon completion of the machining operation, the tool 167 is withdrawn, the clamping plate 145 moved away from the base 143, the workpiece 161 removed and a new workpiece inserted for the next operation.

It will be apparent that for satisfactory use, the clamping plate 145 must slide without binding on the posts 147, 149 but without a significant amount of lateral play in the parts. However, since these parts are independently made, binding between the posts 147, 149 and the clamping plate 145 quite often does occur as a result of manufacturing tolerances, distortion, etc., of any one or several of the posts. In order to overcome this problem, these posts 147, 149 are laterally adjustable relative to each other.

Thus, as shown in the figures, each of the post bases 151, 153 has a recess 171, 173 formed in the bottom thereof. A pair of plugs or caps 175, 177 complementary in cross-section and size-to-size with or a few thousandths larger or smaller than the recesses is received in the recesses 171, 173, respectively, and each of the plugs has a depending extension 179, 181 fitted in openings 183, 185 in the base 143. To provide the necessary relative lateral adjustment for the posts 147, 149, the post base 151 has a plurality of angularly spaced slots 187 cut into and extending axially and away from its bottom face. These slots 187 are disposed near the surface of the recess 171 and form a corresponding number (in this case two) of flexible fingers 189. The surface of the recess 171 has peripheral relief areas 191, the axial length of which exceed the length of the plug 175 and which extend entirely therearound except for relatively small areas 193 on each of the fingers 189. A plurality of set screws 195 is threadedly received within openings 197 in the post base 151, one adjacent each of the slots 187, and each of the set screws has its inner end positioned to engage a respective one of the flexible fingers 189. Thus, by tightening one of the set screws 195 and loosening the other, one of the flexible fingers 189 and therefore the post 147 is shifted laterally. As was the case in the embodiments of FIGS. 1–4 and 5–7, the relief areas 191 and the finger 189 adjacent the loosened set screws 195 accommodates this shifting.

In the embodiments of FIGS. 1–4 and 5–7, it was stated that at least three slots and flexible fingers are needed to afford the necessary accuracy and rigidity required in the use of the fixture shown in those embodiments. In the embodiment of FIGS. 8–10, however, the requirement for rigidity of the fixture illustrated therein is not so critical and at least in some installations, two fingers are sufficient. However, it is to be understood that if a more rigid assembly is required, three or more slots and fingers can be employed.

By the present invention, there has been provided an improved fixture mounting adapted to laterally adjust and securely hold a fixture during use. While it is apparent that the embodiments of the invention illustrated and described above in detail are well calculated to fulfill the objects and advantages stated above, it will also be apparent that various additions, substitutions, modifications and omissions may be made thereto without departing from the spirit of the invention as encompassed by the appended claims.

What is claimed is:

1. An assembly including
a body having an annular member,
a supporting member for said body,
means rigidly interconnecting said body and said supporting member comprising opposed inwardly and outwardly facing annular surfaces on said members,
at least three angularly substantially equi-spaced, radially deflectable wall portions in one of said members adjacent to said annular surfaces,
a radially projecting surface on each of said wall portions adapted to engage the opposed annular surface, and
means for controllably moving selected deflectable wall portions radially inwardly and allowing other of said deflectable wall portions to move radially outwardly whereby said body is adjusted laterally of said supporting member.

2. A chuck including
a diaphragm member having a flexible wall with a plurality of angularly spaced jaws mounted thereon,
a mounting member for said diaphragm member,
means for rigidly interconnecting said diaphragm member and
said mounting member comprising a cylindrical surface formed on one of said diaphragm member and said mounting member, the other of said diaphragm member and said mounting member having
an opening surrounding said cylindrical surface,
one of said members having a plurality of angularly spaced radially deflectable wall portions adjacent to said opening,
an inwardly projecting surface formed on each of said wall portions and adapted to snugly engage said cylindrical surface, and
means for controllably moving selected ones of said deflectable wall portions radially inwardly and allowing other ones of said deflectable wall portions to move radially outwardly, whereby said diaphragm means is adjusted laterally of said mounting member.

3. A chuck including
diaphragm means having a flexible wall with a plurality of angularly spaced jaws mounted thereon,
means rigidly interconnecting said diaphragm means and
a machine spindle mounting member comprising a cylindrical surface formed on one of said diaphragm means and said spindle mounting member, the other of said diaphragm means and said spindle mounting member having an opening surrounding said cylindrical surface,
one of said diaphragm means and said spindle mounting member having a plurality of angularly spaced radially deflectable wall portions adjacent to said opening,
an inwardly projecting surface formed on each of said wall portions and adapted to snugly engage said cylindrical surface,
a plurality of set screws extending radially of and threadedly received within the other of said diaphragm means and said spindle mounting member, each of said set screws having its inner end positioned to engage and controllably deflect an adjacent one of said wall portions whereby said diaphragm means is adjusted laterally of said spindle mounting member.

4. In a diaphragm chuck,
separate, interconnected, diaphragm and mounting portions provided with interfitting parts having confronting, inner and outer annular surfaces,
one of said portions having a plurality of discrete, circumferentially spaced, essentially thin radially flexible bearing sections seating solidly against the confronting annular surface of the other portion, and one of said portions being formed intermediate said bearing sections to provide radial relief between said inner and outer annular surfaces, and
adjustable means coacting with said bearing sections for flexing the latter radially to adjust one of said portions selectively relative to the other of said portions and to hold the same in the selected adjusted position.

5. A chuck including
diaphragm means having a flexible wall with a plurality of angularly spaced jaws mounted thereon,
means rigidly interconnecting said diaphragm means and
a machine spindle mounting member comprising a cylindrical surface formed on one of said diaphragm means and said spindle mounting member, the other of said diaphragm means and said spindle mounting member having an annular portion receiving said cylindrical surface,
a plurality of angularly spaced, axially extending slots in said annular portion and forming a plurality of radially deflectable wall portions,
an inwardly projecting surface formed on each of said wall portions and adapted to snugly engage said cylindrical surface, and
means for controllably moving selected ones of said deflectable wall portions radially inwardly and allowing other ones of said deflectable wall portions to move radially outwardly, whereby said diaphragm means is adjusted laterally of said spindle mounting member.

6. A chuck including
diaphragm means having a flexible wall with a plurality of angularly spaced jaws mounted thereon,
mounting means rigidly attaching said diaphragm means to a machine spindle, said mounting means comprising
 a body having an annular end receiving one end of said diaphragm means, said body having
  a plurality of angularly spaced, radially deflectable wall portions within said annular end, adapted to snugly engage said diaphragm one end,
  relieved areas formed between said wall portions, and
  means for controllably deflecting selected ones of said wall portions radially inwardly and allowing other ones of said wall portions to move radially outwardly, whereby said diaphragm is adjusted laterally of said mounting means.

7. In a diaphragm chuck,
separate, interconnected, diaphragm and mounting portions provided with inner and outer interfitting parts having confronting, annular surfaces,
 said outer part being formed with a plurality of circumferentially spaced, radially flexible bearing sections seating on the annular surface of said inner part and being radially relieved opposite the annular surface of said inner part and intermediate said bearing sections, and
 adjustable means carried by one of said portions engageable with said bearing sections and movable against and from the same to adjust said outer part selectively radially relative to said inner part.

8. A chuck including
diaphragm means having a flexible wall with a plurality of angularly spaced jaws mounted thereon,
a circular projection formed on one end of said diaphragm means,
mounting means rigidly attaching said diaphragm means to a machine spindle, said mounting means comprising
 a body having an annular end receiving said diaphragm circular projection, said body having
  a plurality of angularly spaced, radially deflectable wall portions within said annular end, adapted to snugly engage said projection,
  relieved areas formed between said wall portions and having an axial length at least as great as said projection, and
  means for controllably deflecting selected ones of said wall portions radially inwardly and allowing other ones of said wall portions to move radially outwardly, whereby said diaphragm is adjusted laterally of said mounting means.

9. A chuck including
diaphragm means having a flexible wall with a plurality of angularly spaced jaws mounted thereon,
mounting means rigidly attaching said diaphragm means to a machine spindle, said mounting means comprising
 a body having an annular end receiving one end of said diaphragm means and forming with said diaphragm means
 a hollow cylinder,
 a piston slidable within said body for deflecting said flexible wall, said body having
  a plurality of angularly spaced, radially deflectable wall portions within said annular end adapted to snugly engage said diaphragm one end,
  relieved areas formed between said wall portions, and
  means for controllably deflecting selected ones of said wall portions radially inwardly and allowing other ones of said wall portions to move radially outwardly, whereby said diaphragm is adjusted laterally of said mounting means.

10. A chuck including
diaphragm means having a flexible wall with a plurality of angularly spaced jaws mounted thereon,
mounting means rigidly attaching said diaphragm means to a machine spindle, said mounting means comprising
 a body having an annular end receiving one end of said diaphragm means, said body having
  a plurality of angularly spaced, axially extending slots in said annular end forming a plurality of radially deflectable fingers, each of said fingers having an inwardly projecting surface adapted to snugly engage said diaphragm one end,
  relieved areas formed between said wall portions, and
  means for controllably deflecting selected ones of said wall portions radially inwardly and allowing other ones of said wall portions to move radially outwardly, whereby said diaphragm is adjusted laterally of said mounting means.

11. In a diaphragm chuck,
separate, interconnected, diaphragm and mounting portions radially adjustable relative to each other, said diaphragm and mounting portions being provided with inner and outer interfitting parts having confronting annular surfaces,
 said outer part having a plurality of circumferentially spaced slots extending axially from one end thereof and defining radially flexible bearing sections at the inner sides thereof and
essentially rigid supporting sections at the outer sides thereof,
 the annular surface of said outer part being radially relieved intermediate said bearing sections and opposite the annular surface of said inner part, and
adjustable set screws in the supporting sections of said outer part movable against and from said bearing sections to flex the latter selectively whereby to adjust one of said chuck portions radially relative to the other.

12. A chuck including
diaphragm means having a flexible front wall and a rigid rear wall,
a plurality of angularly spaced jaws on said front wall
a cylindrical projection on said rear wall and extending rearwardly therefrom,
mounting means for rigidly attaching said diaphragm means to a machine spindle, said mounting means including
 a body having an annular end receiving said cylindrical projection, said annular end having at least three angularly spaced axially extending slots forming a corresponding number of radially deflectable fingers within said annular end adapted to snugly engage said cylindrical projection, arcuate relieved areas between said fingers and having an axial length greater than said cylindrical projection, means on said annular end for controllably deflecting selected ones of said wall portions radially inwardly and allowing other ones of said wall portions to move radially outwardly, whereby to adjust said diaphragm laterally of said mounting means.

13. A chuck including diaphragm means having a flexible front wall and a rigid wall, a plurality of angularly spaced jaws on said front wall, a cylindrical projection on said rear wall and extending rearwardly therefrom, mounting means for rigidly attaching said diaphragm means to a machine spindle, said mounting means including a body having an annular end receiving said cylindrical projection said annular end having four angularly spaced axially extending slots forming a corresponding number of radially deflectable fingers within said annular end adapted to snugly engage said cylindrical projection, arcuate relieved areas between said fingers and having an axial length greater than said cylindrical projection, means on said annular end for controllably deflecting selected ones of said wall portions radially inwardly and allowing other ones of said wall portions to move radially outwardly, whereby to adjust said diaphragm laterally of said mounting means.

14. A chuck including diaphragm means having a flexible front wall and a rigid rear wall, a plurality of angularly spaced jaws on said front wall, a cylindrical projection on said rear wall and extending rearwardly therefrom, mounting means for rigidly attaching said diaphragm means to a machine spindle, said mounting means including a body having an annular end receiving said cylindrical projection, a piston slidable within said annular end and operatively engaging said diaphragm front wall for deflection thereof, said annular end having at least three angularly spaced axially extending slots forming a corresponding number of radially deflectable fingers within said annular end adapted to snugly engage said cylindrical projection, arcuate relieved areas between said fingers and having an axial length greater than said cylindrical projection, means on said annular end for controllably deflecting selected ones of said wall portions radially inwardly and allowing other ones of said wall portions to move radially outwardly, whereby to adjust said diaphragm laterally of said mounting means.

15. A chuck including diaphragm means having a flexible front wall and a rigid rear wall, a plurality of angularly spaced jaws on said front wall, a cylindrical projection on said rear wall and extending rearwardly therefrom, mounting means for rigidly attaching said diaphragm means to a machine spindle, said mounting means including a body having an annular end receiving said cylindrical projection, said annular end having at least three angularly spaced axially extending slots forming a corresponding number of radially deflectable fingers within said annular end adapted to snugly engage said cylindrical projection, arcuate relieved areas between said fingers and having an axial length greater than said cylindrical projection, a plurality of set screws on said annular end, each having an inner end engaging a respective one of said fingers for controllably deflecting selected ones of said wall portions radially inwardly and allowing other ones of said wall portions to move radially outwardly, whereby to adjust said diaphragm laterally of said mounting means.

16. In a fixture mounting assembly, separate, interconnected, fixture and mounting portions provided with interfitting parts having confronting, inner and outer annular surfaces, one of said portions having at least three discrete, circumferentially substantially equi-spaced, essentially thin, radially flexible bearing sections seating solidly against the confronting annular surface of said other portion, each of said bearing sections being separated from both adjacent bearing sections by relieved areas which provide radial clearance between said inner and outer annular surfaces except for said bearing sections, and adjustable means coacting with said bearing sections for flexing the latter radially to adjust one of said portions selectively laterally relative to the other of said portions and to hold the same in the selected adjacent position.

References Cited

UNITED STATES PATENTS

| 288,489 | 11/1883 | Proctor | 287—110 X |
| 1,183,190 | 5/1916 | Hansell | 308—236 X |
| 2,714,514 | 8/1955 | Howart | 279—1 |
| 3,088,746 | 5/1963 | Highberg | 279—110 |

ROBERT C. RIORDON, Primary Examiner

DAVID R. MELTON, Assistant Examiner

U.S. Cl. X.R.

82—45; 279—6; 287—110; 308—236